(12) United States Patent
Fan et al.

(10) Patent No.: US 9,906,549 B2
(45) Date of Patent: Feb. 27, 2018

(54) PROXY ENGINE FOR CUSTOM HANDLING OF WEB CONTENT

(75) Inventors: Xiaofeng Fan, Redmond, WA (US); Jiahe Helen Wang, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1435 days.

(21) Appl. No.: 11/851,303

(22) Filed: Sep. 6, 2007

(65) Prior Publication Data

US 2009/0070869 A1 Mar. 12, 2009

(51) Int. Cl.
| | |
|---|---|
| *G06F 11/00* | (2006.01) |
| *H04L 29/06* | (2006.01) |
| *G06F 21/51* | (2013.01) |
| *G06F 12/14* | (2006.01) |
| *H04L 29/08* | (2006.01) |

(52) U.S. Cl.
CPC .......... *H04L 63/1441* (2013.01); *G06F 21/51* (2013.01); *G06F 2221/2119* (2013.01); *H04L 63/0281* (2013.01); *H04L 67/2819* (2013.01)

(58) Field of Classification Search
CPC .... G06F 21/128; G06F 9/45529; G06F 21/51; G06F 2221/2119; H04L 63/0281; H04L 63/1441; H04L 67/2819
USPC .......................................................... 726/22
See application file for complete search history.

(56) References Cited

U.S. PATENT DOCUMENTS

| | | | |
|---|---|---|---|
| 6,188,401 B1 | 2/2001 | Peyer | |
| 6,470,349 B1 | 10/2002 | Heninger et al. | |
| 6,567,918 B1* | 5/2003 | Flynn et al. | ........................ 726/7 |
| 6,691,176 B1 | 2/2004 | Narin et al. | |
| 6,944,660 B2 | 9/2005 | Eshghi et al. | |
| 7,421,441 B1* | 9/2008 | Chan | ................. G06F 17/30864 |
| 7,594,166 B1* | 9/2009 | Ramakrishna | ...... G06F 17/3089 |
| | | | 709/203 |
| 8,850,520 B1* | 9/2014 | Pike | ........................ G06F 21/33 |
| | | | 709/201 |
| 2002/0016820 A1 | 2/2002 | Du Val et al. | |
| 2002/0073116 A1* | 6/2002 | Middleton | .............. H03M 7/30 |
| | | | 715/242 |
| 2002/0103823 A1* | 8/2002 | Jackson et al. | ............ 707/501.1 |

(Continued)

FOREIGN PATENT DOCUMENTS

EP 1420562 A2 5/2004

OTHER PUBLICATIONS

Erlingsson, et al., "End-to-end Web Application Security", available at least as early as Jun. 7, 2007, at <<http://research.microsoft.com/users/ulfar/e2ewebappsec.pdf>>, pp. 6.

(Continued)

*Primary Examiner* — Gary Gracia
(74) *Attorney, Agent, or Firm* — Drinker Biddle & Reath LLP (57) ABSTRACT

Processes and techniques for protecting web users from malicious executable code are described. A proxy engine is implemented that intercepts communications between a web browser and a script engine. The proxy engine can invoke a variety of custom event handlers that are configured to handle specific types of events (e.g., script events) that occur in the processing of web content. A script shield event handler detects the presence of script in pre-defined script-free zones and prevents the script from being executed on a user's device.

13 Claims, 8 Drawing Sheets

(56) References Cited

U.S. PATENT DOCUMENTS

| | | |
|---|---|---|
| 2002/0116407 A1* | 8/2002 | Negishi ............ G06F 17/30899 |
| 2002/0147570 A1* | 10/2002 | Kraft .................... G06Q 30/02 702/186 |
| 2003/0023674 A1* | 1/2003 | Hildebrand ......... G06F 17/3089 709/203 |
| 2003/0023754 A1 | 1/2003 | Eichstadt et al. |
| 2003/0065874 A1* | 4/2003 | Marron et al. ............... 711/100 |
| 2003/0135504 A1* | 7/2003 | Elvanoglu ......... G06F 17/30896 |
| 2004/0039827 A1* | 2/2004 | Thomas ................ H04L 29/06 709/228 |
| 2004/0103200 A1* | 5/2004 | Ross et al. .................... 709/228 |
| 2004/0148337 A1 | 7/2004 | Duncan |
| 2004/0205411 A1 | 10/2004 | Hong et al. |
| 2004/0205708 A1* | 10/2004 | Kothari et al. ............... 717/113 |
| 2004/0260754 A1 | 12/2004 | Olson et al. |
| 2005/0015387 A1 | 1/2005 | Sassi et al. |
| 2005/0059453 A1* | 3/2005 | Benbrahim et al. ............ 463/16 |
| 2005/0204047 A1 | 9/2005 | Mitchell et al. |
| 2005/0204282 A1* | 9/2005 | Harutunian ............... G06F 9/54 715/200 |
| 2005/0223029 A1* | 10/2005 | Roser ................ G06F 17/30905 |
| 2005/0246683 A1* | 11/2005 | Usov ............................. 717/115 |
| 2005/0256960 A1 | 11/2005 | Ganesh et al. |
| 2006/0004479 A1* | 1/2006 | Oyama .............. G05B 19/4155 700/181 |
| 2006/0020693 A1* | 1/2006 | Hellstrom ......... G06F 17/30902 709/223 |
| 2006/0059462 A1* | 3/2006 | Yamamoto ........ G06F 17/30861 717/115 |
| 2006/0101007 A1* | 5/2006 | Go .................... G06F 17/30887 |
| 2006/0129982 A1 | 6/2006 | Doyle |
| 2006/0225036 A1 | 10/2006 | Pandit et al. |
| 2006/0248101 A1* | 11/2006 | Griep ............................ 707/101 |
| 2007/0006148 A1* | 1/2007 | Varshney et al. ............. 717/115 |
| 2007/0016949 A1 | 1/2007 | Dunagan et al. |
| 2007/0050476 A1* | 3/2007 | Etgen et al. ................... 709/219 |
| 2007/0061700 A1* | 3/2007 | Kothari et al. ............... 715/505 |
| 2007/0102764 A1* | 5/2007 | Ando .............. G11B 20/00086 257/355 |
| 2007/0113237 A1* | 5/2007 | Hickson ................ G06F 9/542 719/318 |
| 2007/0113282 A1* | 5/2007 | Ross ....................... G06F 21/52 726/22 |
| 2007/0156871 A1 | 7/2007 | Braun et al. |
| 2007/0157078 A1* | 7/2007 | Anderson ..................... 715/513 |
| 2007/0169199 A1* | 7/2007 | Quinnell et al. ................ 726/25 |
| 2007/0199000 A1* | 8/2007 | Shekhel et al. ............... 719/330 |
| 2007/0204223 A1* | 8/2007 | Bartels ............... H04N 21/4532 715/210 |
| 2007/0226249 A1* | 9/2007 | Kacin et al. ................... 707/102 |
| 2007/0271511 A1* | 11/2007 | Khopkar et al. .............. 715/540 |
| 2008/0083012 A1* | 4/2008 | Yu et al. ............................ 726/1 |
| 2008/0098296 A1* | 4/2008 | Brichford et al. ............ 715/234 |
| 2008/0127338 A1 | 5/2008 | Cho et al. |
| 2008/0178162 A1* | 7/2008 | Sanford et al. ............... 717/139 |
| 2008/0281983 A1* | 11/2008 | Cooley ................. H04L 63/145 709/245 |
| 2008/0313648 A1* | 12/2008 | Wang ...................... G06F 21/53 719/315 |
| 2009/0070869 A1 | 3/2009 | Fan et al. |
| 2009/0125469 A1* | 5/2009 | McDonald et al. ............ 706/47 |
| 2009/0138937 A1* | 5/2009 | Erlingsson .......... H04L 63/1416 726/1 |
| 2009/0254572 A1 | 10/2009 | Redlich et al. |
| 2011/0185427 A1 | 7/2011 | Aciicmez et al. |
| 2013/0185350 A1 | 7/2013 | Wicker et al. |

OTHER PUBLICATIONS

Jim, et al., "Defeating Script Injection Attacks with Browser-Enforced Embedded Policies", available at least as early as Jun. 7, 2007, at <<http://www.research.att.com/~trevor/papers/beep-tr.pdf>>, 2006, pp. 16.

Johns, "SessionSafe: Implementing XSS Immune Session Handling", available at least as early as Jun. 7, 2007, at <<http://research.microsoft.com/users/ulfar/e2ewebappsec.pdf>>, Springer-Verlag Berlin Heidelberg, 2006, pp. 17.

Office Action for U.S. Appl. No. 11/851,309, mailed on Jul. 19, 2011, Xiaofeng Fan, "Proxy Engine for Custom Handling of Web Content".

"Pop-up Advertisements", BBC Homepage, h2g2, Created Sep. 19, 2002, Published Oct. 30, 2002, Available at <<http://web.archive.org/web/20021030065628/http://www.bbc.co.uk/dna/h2g2/A823411>>, 5 pgs.

Office action for U.S. Appl. No. 11/851,309, mailed on Sep. 3, 2013, Fan et al., "Proxy Engine for Custom Handling of Web Content", 23 pages.

Microsoft Office, "The Microsoft Office Open XML Formats: Preview for Developers", Jun. 2005, retrived at <<www.microsoft.com/office/preview>>, pp. 1-pp. 22.

Reis et al., "BrowserShield: Vulnerability-Drvien Filtering of Dynamic HTML", OSDI 2006: Proceedings of the 7th symposium of Operating systems design and implementation, Nov. 2006, USENIX Association, pp. 61-74.

Wall et al., "Programming Perl", O'Reilly Media, Third Edition, pp. 547, 550, 557-568, 577-584, 629-630, 870, & pp. 964, Jul. 2000.

Wang et al., "Shield: Vulnerability-Driven Networks Filters for Preventing Known Vulnerability Exploits", SIGCOMM Comput. Commun. Rev. 34, Aug. 4, 2004, ACM, pp. 193-pp. 204.

* cited by examiner

PROXY ENGINE FOR CUSTOM HANDLING OF WEB CONTENT

BACKGROUND

Accessing content over the World Wide Web ("web") presents a host of dangers to web users. From computer viruses to Trojan horses, malicious entities are constantly exposing web users to a variety of threats to users' online security. At one end of the security spectrum, these threats can result in temporary service interruptions and require relatively minor computer maintenance. At the other end, such threats can result in the theft of valuable user identification information that can enable a malicious entity to pose as a particular user and impermissibly obtain access to user assets or other valuable information.

One class of online security threat involves exporting executable computer code to a web user's device. Once a web user's device has downloaded an executable, the executable can run on the user's device and potentially inflict damage to the user's device or access user identification information. One scenario in which this may occur is when a user navigates via a web browser to a web site that includes executable code. Due to the dangers presented by sending executable code to web users, many websites forbid the use of executable code within web content provided by certain entities (e.g. web users who upload web content). Executable code encountered on the web is often in the form of a scripting language, such as JavaScript, Python, VBScript, and so on. While many websites employ some type of filter to detect malicious script in web content provided by certain entities, malicious entities have located and exploited loopholes that enable the entities to send malicious executable code to user devices despite such precautionary measures.

One such loophole that occurs is known as cross-site scripting ("XSS"). In XSS, a malicious user can input malicious content, such as a malicious program in a scripting language, into a web page. When an unwary user accesses the web page via a web browser, the malicious content is sent to the user's device along with the other web page content. The malicious program can then run on the user's device and cause damage to the user's device and/or pilfer user information. As mentioned above, many websites forbid users from providing content that contains executable code. However, executable code (e.g., script) can often be hidden in other types of content, such as in markup language content. A filtering process employed by a website might not detect the executable code, and thus the executable code can be sent to web users' devices via the website. Thus, despite such security measures, malicious users are still able to infect web users' devices with malicious executable code.

SUMMARY

Techniques and processes for protecting web users from malicious executable code are described. A proxy engine is implemented that intercepts communications between a web browser and a script engine. The proxy engine can invoke a variety of custom event handlers that are configured to handle specific types of events (e.g., script events) that occur in the processing of web content. A script shield event handler detects the presence of script in pre-defined script-free zones and prevents the script from being executed on a user's device.

This summary is provided to introduce techniques and processes for protecting web users from malicious executable code, which are further described below in the Detailed Description. This summary is not intended to identify essential features of the claimed subject matter, nor is it intended for use in determining the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Described herein are processes and techniques for protecting web users from malicious executable code that may be encountered in web content. A web user navigates to a website via a web browser on the user's device. Content from the website is then transferred to the user's device. The content can include data in the form of markup language (e.g., hypertext markup language (HTML), extensible markup language (XML), extensible hypertext markup language (XHTML), and so on). The content can also include data in the form of executable code created, for example, in a scripting language. When the web browser encounters script in web content, the browser calls a native script engine (i.e., the script engine installed on the user's device to handle script events) to handle the script. A proxy engine intercepts a script call from the web browser and invokes extension platforms enrolled to handle one or more particular script event(s) required to process the script (e.g., parse, execute, and so on). The extension platforms can include event handlers that analyze particular script to determine if the script is benign or malicious. If the scrip is benign, an event handler can forward the script event required to process the script on to the native script engine for processing. If the script event is malicious in origin, an event handler can cancel the script and any associated script event and trigger an alert to the web browser and/or the web server from which the web content originated.

One example of an event handler extension platform is script shield. Script shield enables web developers and other entities to define script-free zones in web content. If a malicious entity injects script content into a script-free zone, the script shield event handler can detect the script and prevent it from running on a user's device. Script shield is discussed in more detail below.

Proxy Engine

Further to the described process and techniques, the proxy engine is introduced. In one implementation, a proxy engine is a software module installed on a client device that intercepts communications between a web browser and a script engine. A web browser is used herein for purposes of discussion, and a proxy engine can be utilized to process communications between a variety of applications. When a proxy engine is initially installed on a client device, the engine registers as a script engine for applications that require script processing, such as a web browser. The proxy engine "wraps" a script engine such that script calls from a web browser intended for the script engine are first routed through the proxy engine. The proxy engine works as a plug-in with a variety of applications and does not require modifications to an application's code in order to be implemented.

A proxy engine can also be configured to intercept document object model (DOM) events communicated from a script engine to a web browser or other entity. In creating web content, malicious entities can embed script content in markup language content. When the markup portion of such content is processed, the script content is revealed and can then be executed on a user's device. Thus, it is advantageous to have the ability to detect script content that is revealed when DOM events are processed. Accordingly, the proxy engine can serve as a rendering engine to handle DOM events for the script engine. Examples of DOM events include object lookup, property invoke, and so on.

A proxy engine can invoke a variety of extension platforms. The proxy engine enables various entities (e.g., software developers, web developers, hardware developers, and so on) to develop custom extension platforms that can enroll with the proxy engine to handle particular processes. One example of an extension platform is a custom event handler created to process one or more types of events. A particular event handler can process script events, DOM events, and/or any other type of event.

Script Shield

Script shield enables a web browser or other application to prevent unwanted or impermissible script from being run on a client device. In one example, impermissible script refers to script that occurs in a context where script content is not allowed. For example, a particular website may have a policy that forbids content providers from inserting script into web content. Thus, if a content provider provides a markup language document (or any other type of content) that includes script content, the script content would be considered impermissible script.

Script shield utilizes a markup language tag to identify script-free zones in content. One example of such a tag is designated <scriptfree>. A content provider can create content as a markup language document and label all or part of the document as a script-free zone with <scriptfree> tags, indicating that no script will occur within the script-free zone(s). One example of a <scriptfree> tag in HTML form and a script-free zone is presented:

```
<html>
<!--1.normal script, ok-->
<script>_ _ _</script>
<!--2.scriptfree context switch on, ok-->
<scriptfree blocked="true" id="CA02" onviolate="_ _ _" />
<!--2.scriptfree context switch off, violating -->
<scriptfree blocked="false" id="XXXX" />
<1.normal script, violating -->
```

-continued

```
<script>_ _ _</script>
<!--2.scriptfree context switch off, ok-->
<scriptfree blocked="false" id="CA02" />
</html>
```

As shown, the <scriptfree> tag is initially used to open a script-free zone and is associated with a dynamically-generated identifier ("ID") (in this example, the ID is "CA02"). Thus, if an entity attempts to prematurely close the script-free zone without the appropriate ID, the closure will be blocked. If any script attempts to run while the script-free zone is open, a violation is triggered and the script is blocked and/or cancelled. The script-free zone can be closed by designating the <scriptfree> context switch as "off" and providing the correct ID. Script that is provided outside of the script-free zone can be considered safe and can be executed on a user's device.

Script shield can be implemented as an extension platform on a proxy engine. When a script event is intercepted by the proxy engine, the script event is routed to script shield and/or any other extension platforms registered for the script event. Script shield examines the script for a <scriptfree> tag. In applications that do not support the <scriptfree> tag, the tag can be provided as a script comment. The comment is passed to the script shield event handler, and script shield reads the comment and detects the <scriptfree> tag. Script shield then opens and/or closes a script-free zone based on the content of the <scriptfree> tag. Thus, if script occurs in a script-free zone, such as through cross-site scripting, the script is cancelled and is not passed to the native script engine.

Script shield can also be implemented on the server side. A web server can implement script shield to ensure that web content uploaded to the web server does not contain impermissible script. This implementation of script shield is discussed in more detail below.

Illustrative Environment

Figure 1:
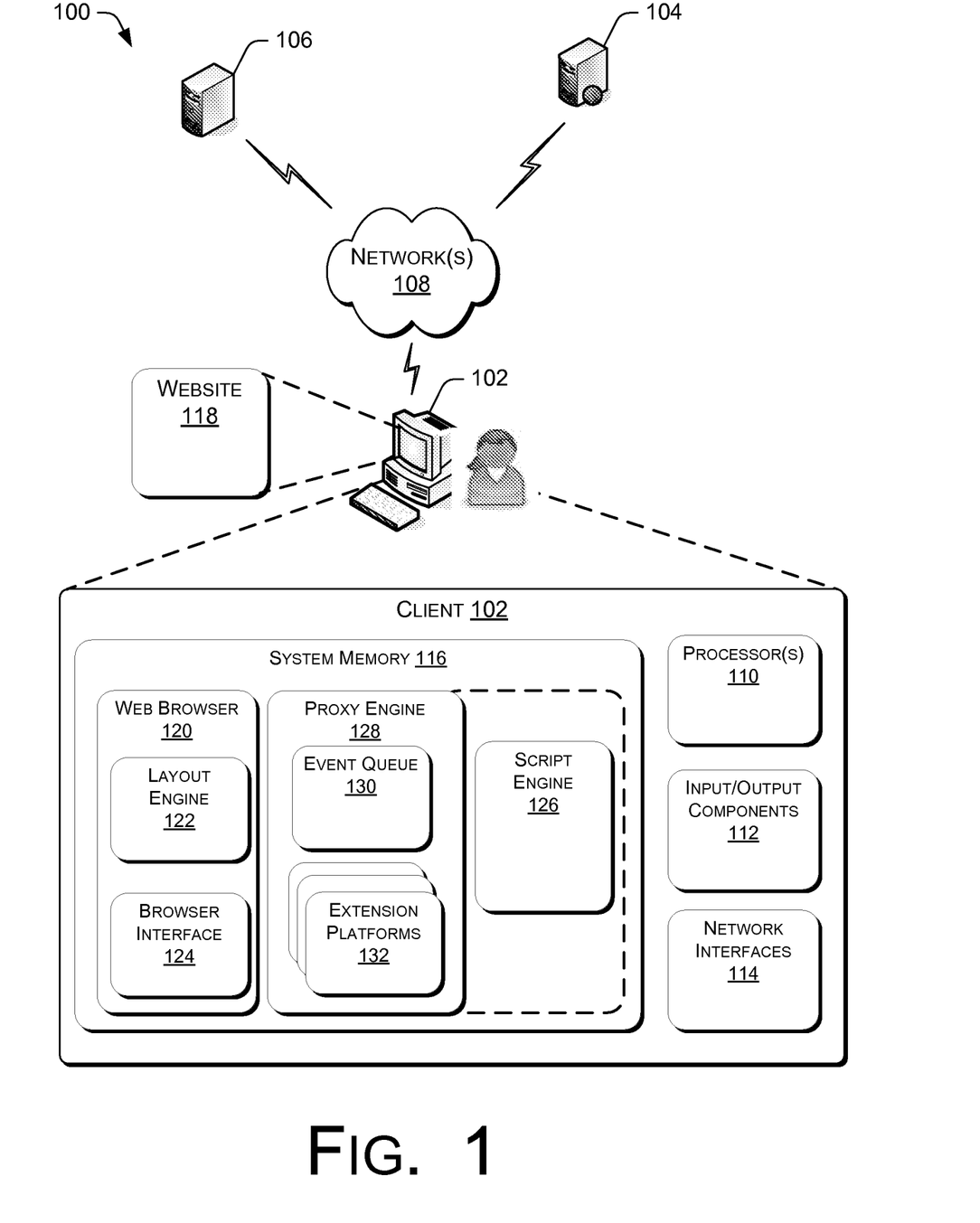
FIG. 1 illustrates one example of an environment for implementing a proxy engine on a client device.

FIG. 1 illustrates at 100 one example of an environment that can utilize the disclosed techniques and processes. Environment 100 is presented for purposes of example only, and the disclosed techniques and processes are broadly applicable to other environments.

Environment 100 includes a client device 102, a web server 104, and a content provider 106. Client device 102 may be implemented in any number of ways including, for example, as a general purpose computing device (e.g., desktops), a laptop, a mobile computing device, a PDA, a communication device, and so on. Web server 104 and content provider 106 may be implemented in many ways including, for example, as standalone general purpose computing devices or mainframes, or as clusters of servers (e.g., arranged in a server farm). Web server 104 and/or content provider 106 can also run databases, such as SQL servers.

A network 108 facilitates communication in environment 100 and is representative of a wireless network, a wired network, or a combination thereof, and can include, but is not limited to, a Local Area Network (LAN), a Wide Area Network (WAN), the Internet, and a Metropolitan Area Network (MAN).

Client device 102 includes processor(s) 110, input/output (I/O) components 112, and network interfaces 114. Processor(s) 110 may be one or more microprocessors, microcomputers, microcontrollers, dual core processors, and so forth. Input/output components 112 provide data I/O capabilities for client device 102 and may include any number of components, such as a scanner port, a mouse port, a keyboard port, and so forth. Network interfaces 114 provide connectivity to a wide variety of networks and protocol types, including wire networks (e.g., LAN, cable, etc.) and wireless networks (e.g., WLAN, cellular, satellite, etc.).

A system memory 116 includes, for example, volatile random access memory (e.g., RAM), non-volatile read-only memory (e.g., ROM, flash memory, etc.), hard disk drives, and so on. System memory 116 stores program modules (e.g., modules 120-132) that implement the described processes and techniques.

In one implementation, a user of client device 102 navigates to a website 118 via a web browser 120 on the client device. Website 118 can be cached on web server 104 and/or retrieved from content provider 106. In one implementation, the website includes content in the form of one or more markup language documents available in any suitable markup language. Web browser 120 receives the website content and processes the content via a layout engine 122. Layout engine 122 is a module that processes the website content so that the content can be displayed on a web browser interface 124.

Website 118 may also include content in the form of script. When layout engine 122 encounters script, it typically makes a call to a script engine 126 to handle script-related events (e.g., script parsing, script execution, and so on). Script engine 126 is a module that is capable of loading, compiling, and running script code, along with other script-related processing. In this implementation, client device 102 includes a proxy engine 128. When proxy engine 128 is initially installed on the client device, the engine registers as a script engine for applications that require script processing, such as web browser 120. Proxy engine 128 "wraps" script engine 126 such that script calls to script engine 126 are first routed through the proxy engine. Proxy engine 128 intercepts communications (e.g., script events) from web browser 120 that are intended for script engine 126 and temporarily stores the communications in an event queue 130.

Extension platforms 132 include a variety of event handlers that are configured to handle events intercepted by proxy engine 128. Event handlers can be configured to handle script events, document object model (DOM) events, and/or other events communicated by web browser 120 and/or script engine 126. Each event handler is enrolled with proxy engine 128. As part of the enrollment process, each event handler indicates one or more events that the handler is configured to process. For example, one event handler may enroll to handle "script parse" events communicated from layout engine 122. Another event handler may enroll to handle "lookup" and/or "invoke" DOM events.

Communications from event queue 130 are submitted to extension platforms 132. Each extension platform can perform a variety of tasks based on the communication, such as ignoring the communication, altering communication parameters, cancelling the communication, and/or passing the communication on to script engine 126. In the case of script event communications, extension platforms 132 can include an event handler that can provide custom script handling (e.g., script parsing, script execution, and so on). An event handler can also cancel a particular script event so that the script is not executed on the client device. An event handler can also ignore a particular event and pass the event to script engine 126. In the case of DOM event communications, an event handler can provide custom DOM event handling. As with script events, an event handler can also cancel a particular DOM event or pass the DOM event on to web browser 120 and/or any other appropriate entity.

Figure 2:
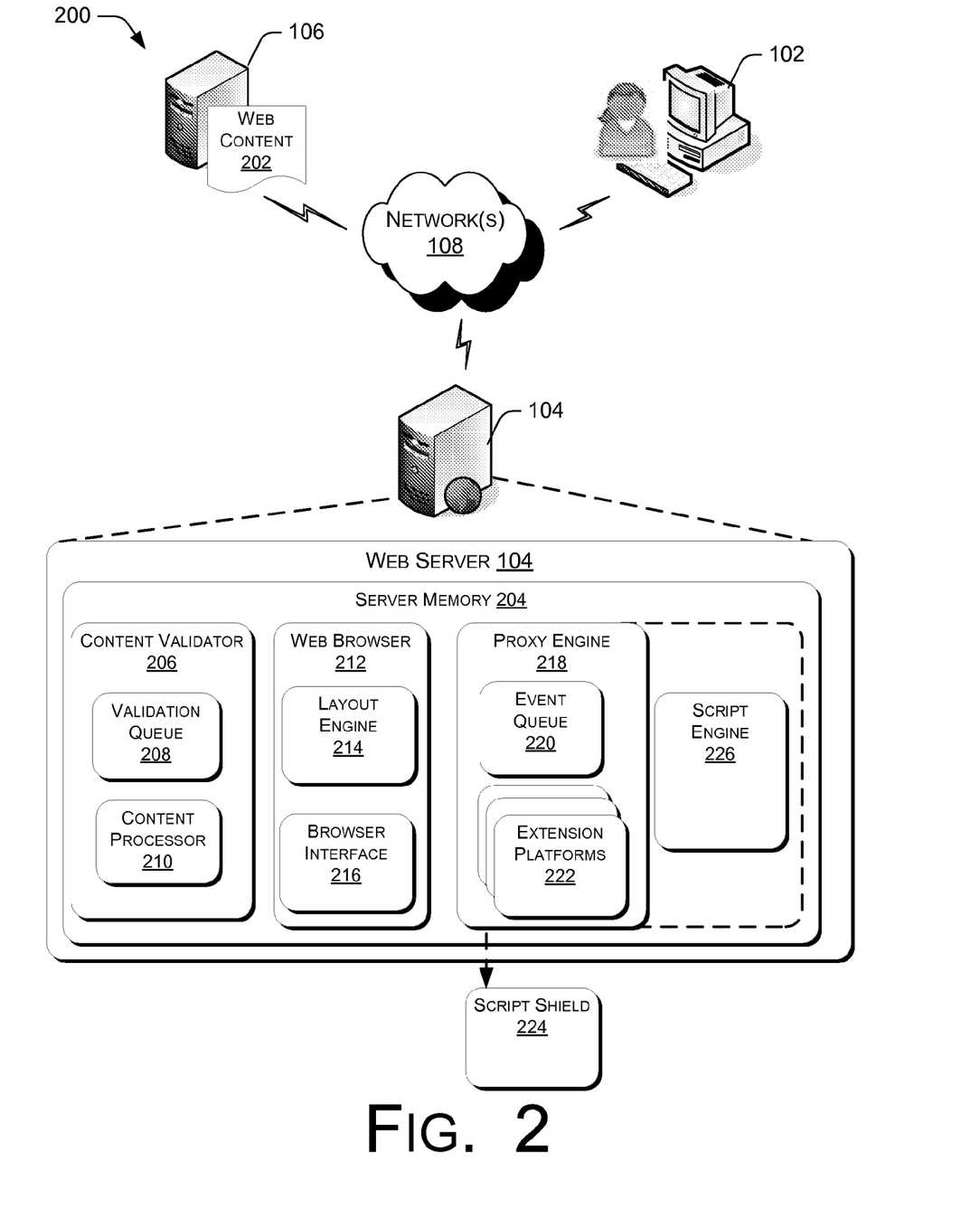
FIG. 2 illustrates one example of an environment for implementing a proxy engine on a web server.

FIG. 2 illustrates at 200 another example of an environment that can utilize the discussed processes and techniques, and is discussed with reference to environment 100. The environments presented in FIGS. 1 and 2 are not intended to be limiting, and aspects and components of the discussed processes and techniques can be implemented according to either implementation, either alone or in combination.

Environment 200 includes client device 102, web server 104, content provider 106, and network(s) 108. In operation, content provider 106 uploads web content 202 (that can include, e.g., website 118) to web server 104. This may be in response to a request by client device 102 for the web content and/or a caching procedure by web server 104. Web server 104 includes a server memory 204 which can include, for example, volatile random access memory (e.g., RAM), non-volatile read-only memory (e.g., ROM, flash memory, etc.), hard disk drives, and so on. Server memory 204 stores program modules (e.g., modules 206-226) that implement the described processes and techniques. A content validator 206 receives web content 202 on web server 104 and places the content in a validation queue 208. Web content 202 is then processed by a content processor 210.

In one implementation, processing web content 202 includes labeling the content with a markup language tag. One example of a suitable markup language tag is the <scriptfree> tag. The <scriptfree> tag opens and closes a script-free zone and web content 202 is placed within the script-free zone. The labeled web content is submitted to a web browser 212. The web browser can reside on the web server as shown in this implementation, but could also reside on devices other than the web server. The labeled web content is processed by a layout engine 214 for display on a browser interface 216. Any script event that is detected is forwarded to a proxy engine 218 which is registered as the default script engine for web browser 212. The script event is placed in event queue 220, which forwards the script event to extension platforms 222. In this implementation, extension platforms 222 include a script shield event handler 224. Script shield 224 detects any <scriptfree> tags and any script-free zones defined by the tags. Script shield 224 analyzes the script-free zones to determine if there exists any script within the zones. If script-shield 224 detects script content within a script-free zone, the script-shield can remove the script content and/or signal content validator 206 that web content 202 contains script. Content validator 206 can then delete web content 202 so that the script is not passed on to web users. A script engine 226 is also available to handle script events forwarded by proxy engine 218. Script engine 226 can process script events associated with web content and can communicate with content validator 206 regarding the safety of the web content. If content validator 206 determines that the web content contains malicious and/or impermissible script, content validator 206 can delete the content from web server 104. Deleting content that contains malicious and/or impermissible script prevents such script from being inadvertently downloaded to a web user's device.

Illustrative Processes

Illustrative processes are described in this section with additional reference to FIGS. 1-2. The illustrative processes may be described in the general context of computer executable instructions and are illustrated as collections of blocks in logical flowcharts, which represent sequences of operations that can be implemented in hardware, software, or a combination thereof. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer-readable storage media, including memory storage devices.

Figure 3:
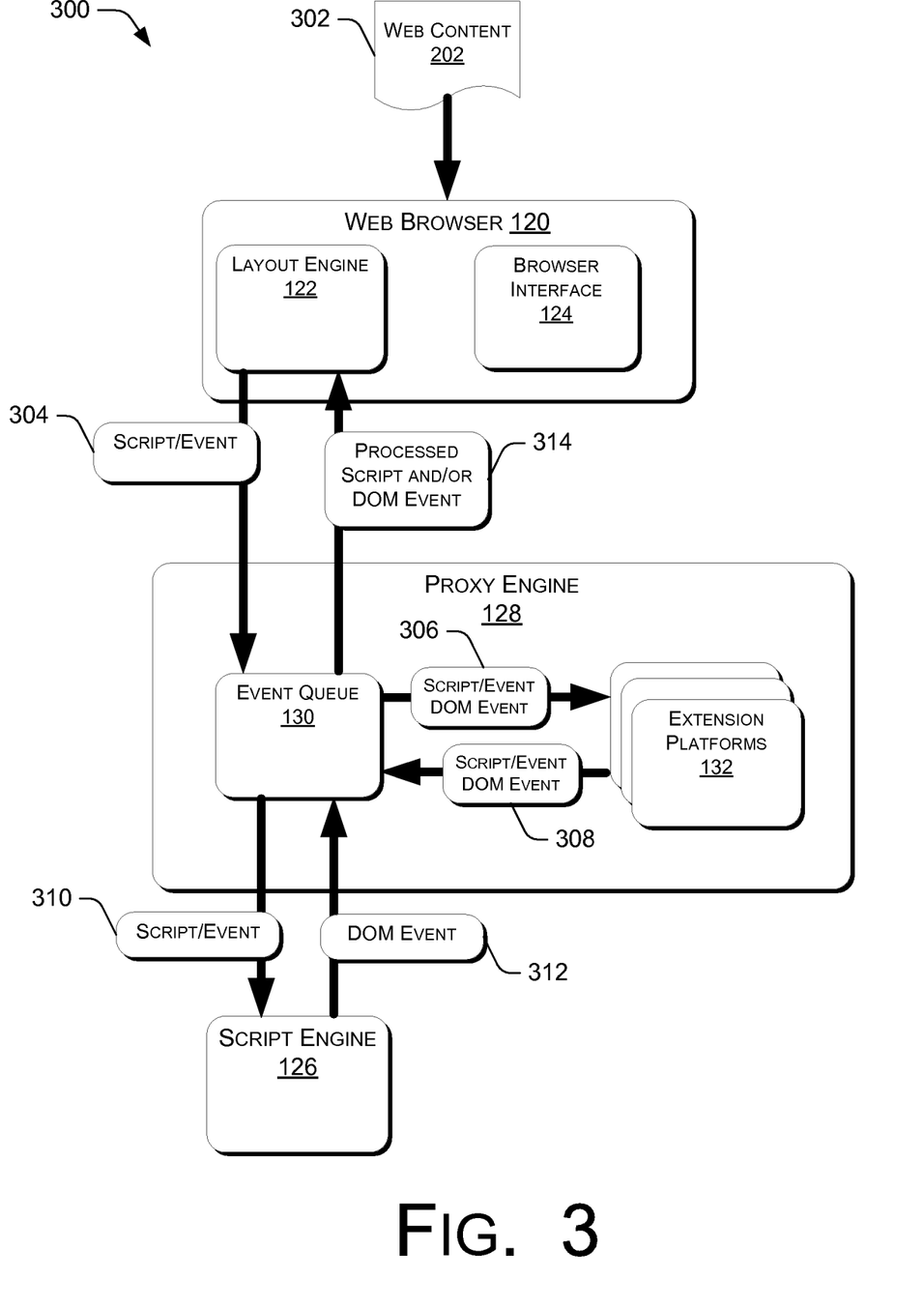
FIG. 3 is a flow diagram of a process for handling script events and document object model events with a proxy engine.

FIG. 3 illustrates at 300 a process for handling web content. Process 300 is discussed with reference to environment 100, but is broadly applicable to a variety of environments and implementations. At 302, web content 202 is provided to web browser 120. As part of processing web content 202 for display on browser interface 124, layout engine 122 determines if web content 202 includes any script content. At 304, script and/or script events from web content 202 are forwarded to proxy engine 128 and are placed in event queue 130. Extension platforms 132 are then invoked by proxy engine 128 and the script/script events are forwarded to the extension platforms at 306. If extension platforms 132 include an event handler enrolled for the particular script/script events, the event handler processes the script/script events. In some implementations, the script/script events are processed and at 308 are returned from extension platforms 132 to event queue 130. At 310, the script/script events are forwarded to script engine 126, which processes the script/script events for layout engine 122. The processed script/script events can then be returned to web browser 120 for display on browser interface 124.

Proxy engine 128 can also intercept DOM event calls from script engine 126 to web browser 120. At 312, a DOM event communicated from script engine 126 to web browser 120 is intercepted by proxy engine 128. The DOM event is placed in event queue 130 and at 306 is forwarded to extension platforms 132. If extension platforms 132 include an event handler enrolled to handle the particular DOM event, the enrolled event handler processes the DOM event. As discussed above, an event handler can ignore, alter, and/or cancel a particular event. At 308, the DOM event can then be returned to event queue 130 and then forwarded at 314 to web browser 120. Web browser 120 can then process the DOM event.

Figure 4:
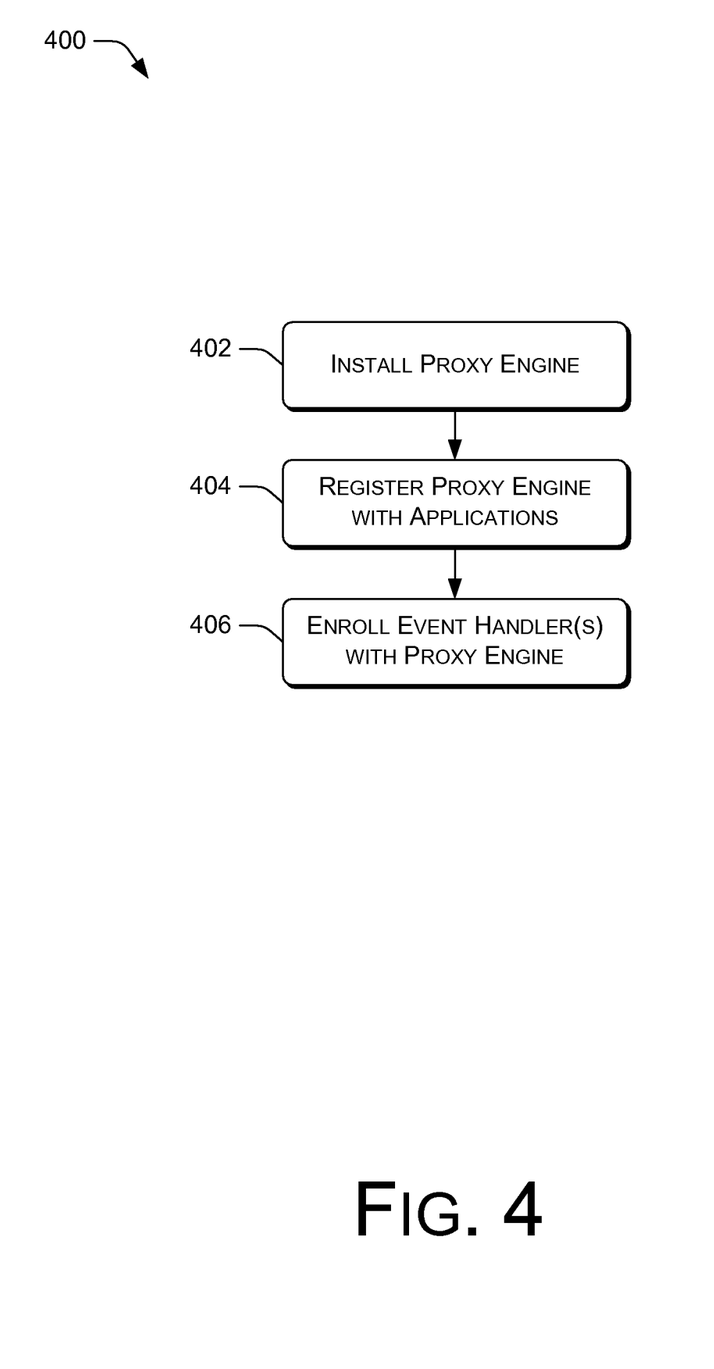
FIG. 4 is a flow diagram of a process for installing a proxy engine on a device.

FIG. 4 illustrates at 400 one example of a process for installing a proxy engine. At 402, the proxy engine is installed on a device, such as a client computer or a web server. At 404, the proxy engine registers as a default script engine and/or rendering engine for one or more applications on the device, such as a web browser and/or script engine. At 406, one or more event handlers are enrolled as extension platforms for the proxy engine. Each event handler is configured to handle specific script events, DOM events, and/or any other appropriate event.

Figure 5:
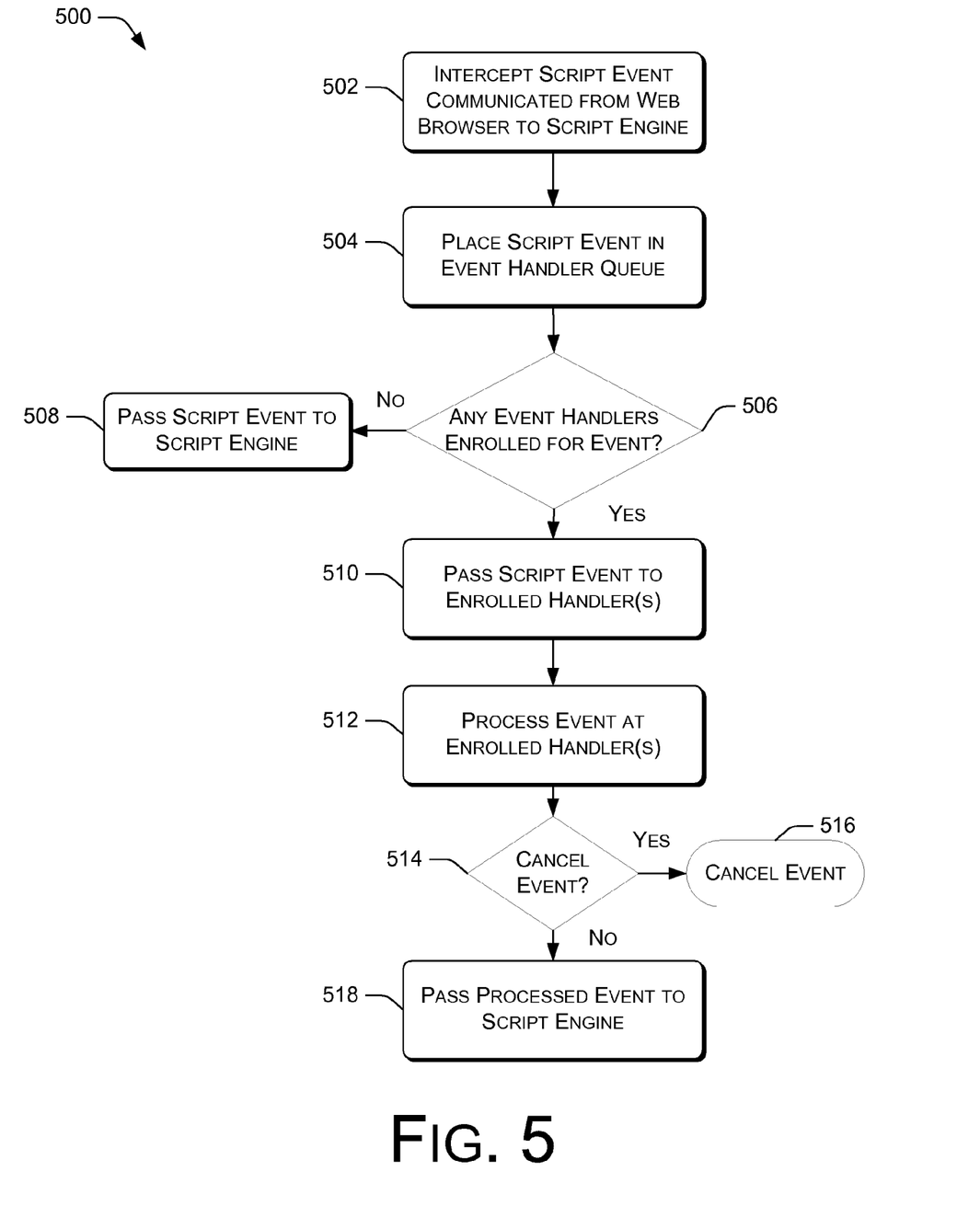
FIG. 5 is a flow diagram of a process for handling a script event with a proxy engine.

FIG. 5 illustrates at 500 one example of a process for handling a script event with a proxy engine. At 502, a script event communicated from a web browser to a script engine is intercepted by a proxy engine. In some implementations, the proxy engine is registered as a default script engine for the web browser, so in these implementations, the web browser sends the script event to the registered proxy engine. At 504, the script event is placed in an event handler queue with any other intercepted script events.

At 506, the proxy engine determines if there are any event handlers enrolled for the particular script event. In some implementations, event handlers enrolled with the proxy engine are invoked and then queried with the particular intercepted script event. If there are no event handlers enrolled for the particular script event, at 508 the script event is passed on to a native script engine to process the script event. If there is at least one event handler enrolled for the particular script event, at 510 the event is forwarded to the enrolled event handler(s). At 512, the event is processed by the enrolled event handler(s). As discussed above, each event handler can provide custom event processing, including cancelling an event, altering an event, and/or forwarding an event on to another entity such as a script engine. In one implementation, processing the event includes determining if the script associated with the event is safe to be run on a user's device. For example, script may be considered safe if the script does not occur within a script-free zone designated by a <scriptfree> tag. Particular event handlers registered with the proxy engine can apply a variety of policies to script to determine if the script is safe.

At 514, it is determined if the event has been or should be cancelled. In one implementation, if it is determined that the script is not safe, the script and any associated event should be cancelled. If the event is to be cancelled, at 516 the event is cancelled. If the event is not cancelled (e.g., the script is safe), at 518 the processed event is passed on to the native script engine for further processing of the script event. In some implementations, the processed event may be returned to the web browser from the proxy engine without being submitted to the native script engine.

Figure 6:
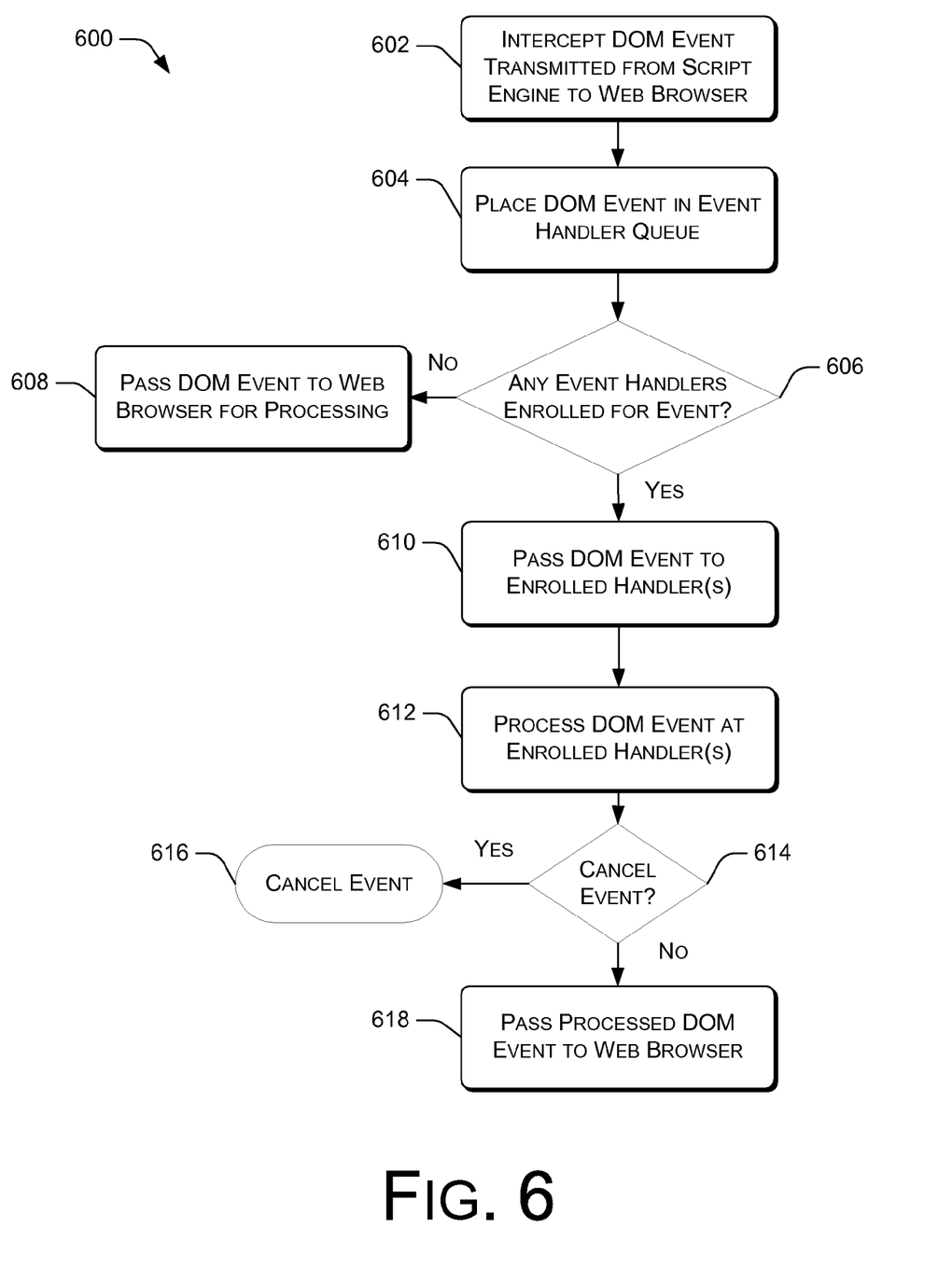
FIG. 6 is a flow diagram of a process for handling a document object model event with a proxy engine.

FIG. 6 illustrates at 600 one example of a process for handling a DOM event with a proxy engine. At 602, a DOM event transmitted from a script engine to a web browser is intercepted by a proxy engine. A web browser is used for purposes of illustration only, and the proxy engine can intercept events communicated between any suitable set of entities. At 604, the DOM event is placed in an event handler queue with any other intercepted DOM events.

At 606, the proxy engine determines if there is an event handler enrolled for the particular intercepted DOM event. If no event handler is enrolled for the particular DOM event, at 608 the event is forwarded to the web browser for processing. If there is an event handler enrolled for the particular event, at 610 the event is forwarded to the enrolled event handler. At 612, the event is processed at the enrolled event handler. At 614, the event handler determines if the event is to be cancelled. In one implementation, if the event handler detects script content revealed as a result of handling a DOM event (which may occur in DOM-based cross-site scripting), the event handler designates the script as impermissible script and cancels the DOM event and/or the script. If the event is to be cancelled, the event is cancelled at 616. If the event is not to be cancelled, at 618 the processed DOM event is passed on to the web browser and/or other appropriate entity for processing. In other implementations, the processed DOM event may not be passed on to the web browser but can be returned to the script engine.

Figure 7:
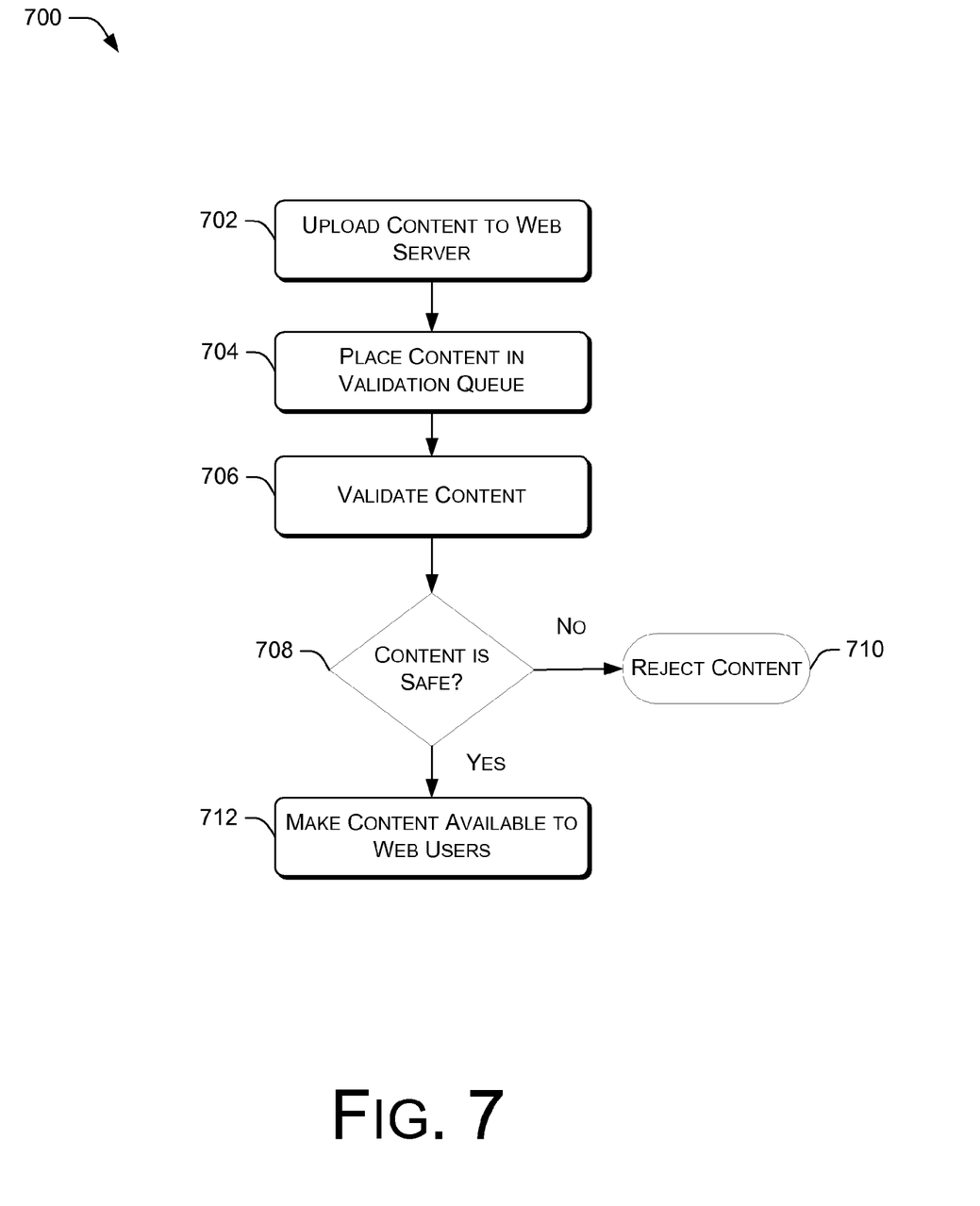
FIG. 7 is a flow diagram of a process for server-side validation of web content using a proxy engine.

FIG. 7 illustrates at 700 one example of a process for validating content at a web server. At 702, content is uploaded from a content provider to a web server. In some implementations, content can include a markup language document for display on a web user's device. At 704, the content is placed in a validation queue at the web server. At 706, the content is submitted to a validation process, an example of which is discussed in more detail below. At 708, it is determined if the content is safe. If the content is deemed unsafe, at 710 the content is rejected. If the content is deemed safe, at 712 the web server makes the content available to web users. In some implementations, safe content is considered content that contains no script or other executable code that can be executed on a web user's device.

Figure 8:
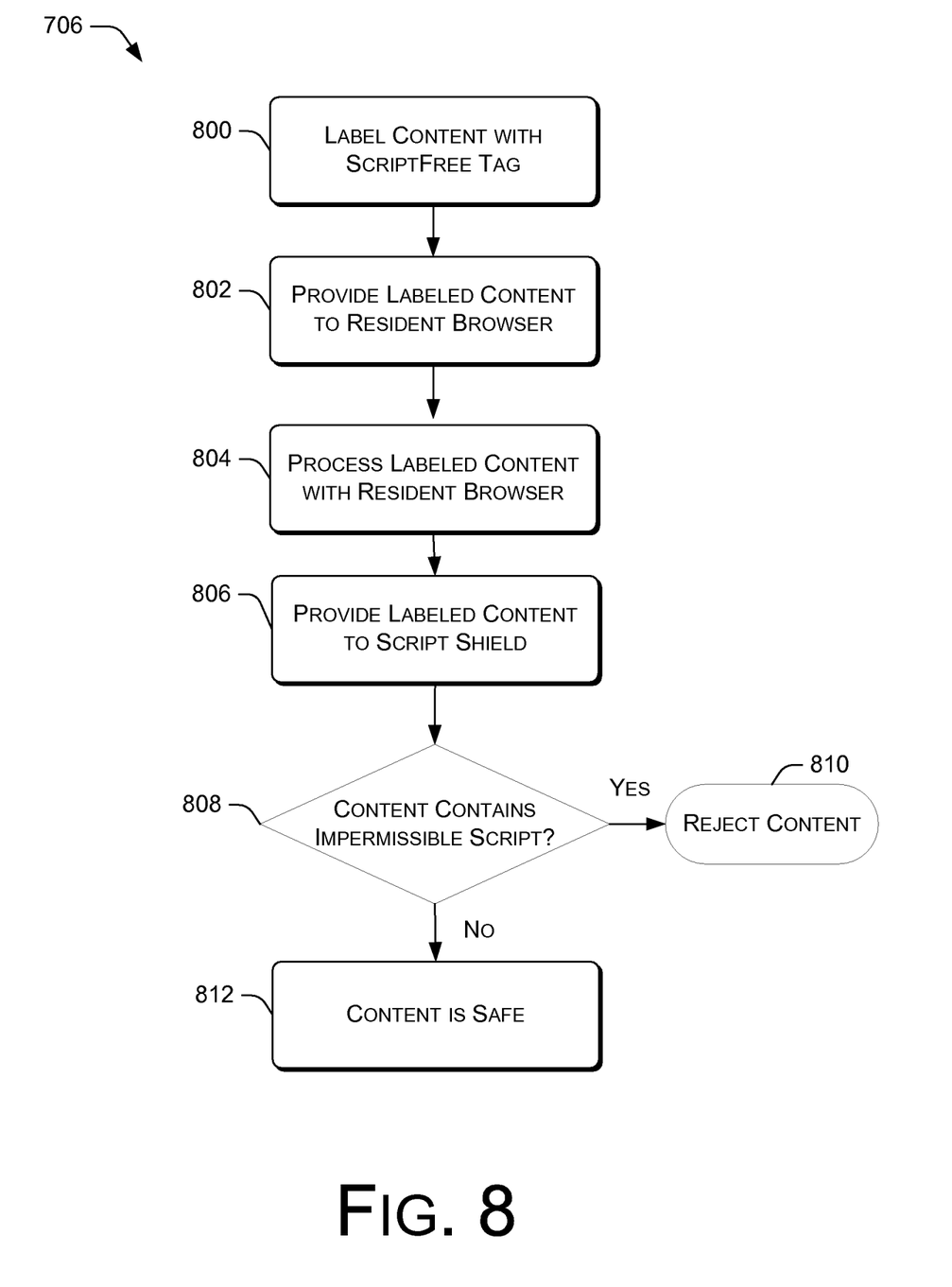
FIG. 8 details certain aspects of FIG. 7 with respect to implementing a script shield.

FIG. 8 illustrates at 706 further aspects of content validation as discussed above in FIG. 7. At 800, the content is labeled with a <scriptfree> tag. In some implementations, a script-free zone is created using <scriptfree> tags and the content is placed within the script-free zone. At 802, the labeled content is provided to a resident web browser or a web browser accessible to the web server. At 804, the labeled content is processed by the web browser. During the processing, the web browser detects the <scriptfree> tags and at 806, forwards the script-free zone defined by the tags to a script shield module accessible to the server. In some implementations, the script shield module is part of a proxy engine resident on the web server. At 808, the script shield module processes the script-free zone within the <scriptfree> tags and determines if there is script within the script-free zone. If there is script within the script-free zone (i.e., impermissible script), the content is considered unsafe and at 810 is rejected. If the script-free zone does not contain script, at 812 the content is considered safe. As discussed above in reference to FIG. 7, the content can then be made available for access by web users.

While various illustrative device and operating implementations have been described, the components, modules, and features of these implementations may be rearranged, modified, and/or may be omitted entirely, depending on the circumstances.

Also, it should be understood that certain acts in the methods need not be performed in the order described, may be rearranged, modified, and/or may be omitted entirely, depending on the circumstances.

Moreover, any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Combinations of the any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention.

What is claimed is:

1. A method to protect web users from malicious executable code comprising:
intercepting at a proxy engine, a communication from a web browser intended for a script engine;
invoking one or more event handlers enrolled as extension platforms for the proxy engine;
determining, by a processor coupled to a memory, by the one or more event handlers, if the communication includes a script that occurs in a script-free zone of the communication, wherein the script-free zone is defined by opening and closing markup languages tags, between which script content is not allowed by the script engine, the opening markup language tag is assigned to a dynamically-generated identifier and marks the beginning of the script-free zone where script content is not allowed and the closing markup language tag is assigned to the same dynamically-generated identifier and marks the end of the script-free zone where script content is not allowed; and
cancelling an event associated with the communication, if the one or more event handlers determine that script occurs in the script-free zone.

2. A method as recited in claim 1, wherein the communication comprises a script event revealed when the proxy engine processes event the communication.

3. A method as recited in claim 1, further comprising:
determining if the communication is safe;
if the communication is safe, passing the communication to the script engine; and
if the communication is not safe, cancelling the communication.

4. A method as recited claim 1, further comprising:
intercepting at the proxy engine a document object model (DOM) event communicated from the script engine and intended for the web browser;
invoking one or more of the extension platforms via the proxy engine; and
processing the DOM event with at least one of the invoked extension platforms.

5. A method as recited in claim 1, further comprising:
cancelling or altering the script in the event that the communication includes impermissible script; and
forwarding the script to the script engine in the event that the communication does not include impermissible script.

6. A method as recited claim 1, wherein the dynamically-generated identifier comprises an alphanumeric code.

7. A method as recited in claim 1, wherein the script event handler is configured to handle script events and document object model (DOM) events.

8. A method to protect web users from malicious executable code comprising:
receiving at a proxy engine a script event from a web browser to a script engine, the proxy engine intercepts scripts sent to the script engine such that script events from the web browser are first routed through the proxy engine;
forwarding the script event from an event queue to one or more extension platforms on the proxy engine;
determining, by a processor coupled to a memory, if the script event includes impermissible script using the one or more extension platforms on the proxy engine, wherein at least one of the one or more extension platforms is a script shield configured to process script events to identify a script that occurs in a script-free zone where script content is not allowed, wherein the script free-zone is defined by opening and closing markup language tags, between which script content is not allowed, the opening markup language tag is assigned to a dynamically-generated identifier and marks the beginning of the script-free zone where script content is not allowed and the closing markup language tag is assigned to the same dynamically-generated identifier and marks the end of the script-free zone where script content is not allowed;

canceling the script event, if the script-free zone is identified as including script;

determining that the script event does not include impermissible script based at least in part on the script-free zone being free of script; and forwarding the communication to the script engine, if the script event is determined to not include impermissible script.

9. A method as recited in claim 8, further comprising:

intercepting at the proxy engine a document object model (DOM) event communicated from the script engine and intended for the web browser;

invoking one or more of the extension platforms via the proxy engine; and processing the DOM event with at least one of the invoked extension platforms.

10. A method as recited in claim 8, wherein the dynamically-generated identifier comprises an alphanumeric code.

11. A method as recited in claim 8, further comprising:

in the event that the script event includes impermissible script, cancelling the communication.

12. A method as recited in claim 8, wherein the proxy engine is further configured to intercept a document object model (DOM) event from the script engine intended for the web browser.

13. A method as recited in claim 8, further comprising blocking attempts to close the script-free zone without the same dynamically-generated identifier.

* * * * *